(12) United States Patent
Nakane et al.

(10) Patent No.: US 6,634,715 B2
(45) Date of Patent: Oct. 21, 2003

(54) HEAD REST DEVICE

(75) Inventors: Hidetoshi Nakane, Toyota (JP); Kouji Miyake, Chiryu (JP); Nobuhiko Takeda, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 1 day.

(21) Appl. No.: 09/790,645

(22) Filed: Feb. 23, 2001

(65) Prior Publication Data

US 2001/0028190 A1 Oct. 11, 2001

(30) Foreign Application Priority Data

Feb. 29, 2000 (JP) ........................................ 2000-054232

(51) Int. Cl.[7] ................................................ A47C 7/36
(52) U.S. Cl. ........................................ 297/408; 297/391
(58) Field of Search ................................ 297/408, 391, 297/452.18, 404, 220

(56) References Cited

U.S. PATENT DOCUMENTS

| | | | |
|---|---|---|---|
| 4,858,994 A | | 8/1989 | Yamashita |
| 5,257,853 A | * | 11/1993 | Elton et al. ............... 297/391 |
| 5,683,141 A | * | 11/1997 | Wakamatsu et al. ........ 297/408 |
| 5,700,057 A | * | 12/1997 | De Filippo ................ 297/408 |
| 5,906,414 A | * | 5/1999 | Rus ........................... 297/408 |
| 5,967,612 A | * | 10/1999 | Takei ........................ 297/391 |
| 6,183,045 B1 | * | 2/2001 | Marfilius et al. ........... 297/391 |
| 6,412,872 B2 | | 7/2002 | Takeda et al. |

FOREIGN PATENT DOCUMENTS

| | | |
|---|---|---|
| GB | 2 164 248 A | 3/1996 |
| JP | 52-11525 | 1/1977 |
| JP | 61-113653 U | 7/1988 |
| JP | 5-269030 A | 10/1993 |
| JP | 9-382 | 1/1997 |
| JP | 9-117347 | 5/1997 |

* cited by examiner

Primary Examiner—Peter M. Cuomo
Assistant Examiner—Stephanie Harris
(74) Attorney, Agent, or Firm—Burns, Doane, Swecker & Mathis, LLP

(57) ABSTRACT

A headrest device includes a stay member having a pair of vertical supporting bars adapted to be supported on a seat back of a vehicle seat and a horizontal supporting bar connecting the pair of vertical supporting bars, and a frame member having a connecting portion rotatably mounted on the horizontal supporting bar with a friction force existing between the horizontal supporting bar and the frame member. The frame member is provided with a slit extending along the connecting portion of the frame member and having ends extending towards the connecting portion. The portion of the frame defined by the slit can be resiliently deformed in the peripheral direction of the horizontal supporting bar and serve as a fulcrum point for adjusting the strength of the rotational friction force of the connecting portion.

22 Claims, 4 Drawing Sheets

HEAD REST DEVICE

This application is based on and claims priority under 35 U.S.C. §119 with respect to Japanese Application No. 2000-054232 filed on Feb. 29, 2000, the entire content of which is incorporated herein by reference.

FIELD OF THE INVENTION

This invention generally relates to a headrest. More particularly, the present invention pertains to a head rest device for a vehicle seat.

BACKGROUND OF THE INVENTION

A known headrest device for a vehicle is disclosed in Japanese Patent Application Laid-Open Publication No. Hei 9 (1997)-382. This headrest device is supported on a seat back frame of a vehicle seat assembly and includes a head rest stay member and a frame member. The frame member of the headrest device is rotatably supported on a horizontal bar of the stay member at a connection portion of the frame member located at the lower portion of the frame member. The connection portion of the stay member engages the frame member with a friction force. In addition, a pad member is formed integrally with the frame and stay members, and covers the frame and an upper portion of the stay member.

To ensure a stable frictional engagement of the frame member on the stay ember, clamp members forming separately prepared parts of the frame are used for rotationally supporting the frame member on the stay member.

In the case of a headrest unit which has a frame directly connected with a stay member, it is difficult to control the friction force for the headrest substantially within a desirable range upon assembling the headrest device. To try to avoid large friction force changes or variations during assembly, it may be possible to employ well-prepared clamp members. However, this undesirably increases the number of parts as well as the cost of the headrest.

A need thus exists for an improved headrest device that is able to provide a relatively stable frictional force between the stay member and the frame member without significantly increasing the number of parts of the headrest device and without substantially increasing the cost associated with the headrest device.

SUMMARY OF THE INVENTION

According to one aspect of the invention, a headrest device includes a stay member and a frame member. The stay member has a pair of vertical supporting bars adapted to be supported on a seat back of a vehicle seat and a horizontal supporting bar connecting the pair of vertical supporting bars. The frame member has a connecting portion rotatably mounting the frame member on the horizontal supporting bar to produce a rotational friction force between the connecting portion and the horizontal supporting bar allowing the frame member to be fixed at a desired position relative to the stay member while also allowing the frame member to be rotated relative to the horizontal supporting bar upon application of a force. The frame member is provided with a slit having an intermediate portion and end portions, with the end portions of the slit extending towards the connecting portion so that the portion of the frame member bounded by the slit is resiliently deformed in a peripheral direction of the horizontal supporting bar to work as a fulcrum point for adjusting the rotational friction force between the connecting portion and the horizontal supporting bar.

According to another aspect of the invention, a headrest device includes a stay member, a frame member and a pad mounted on the frame member. The stay member has a pair of vertical supporting bars adapted to be supported on a seat back of a vehicle seat and a horizontal supporting bar connecting the pair of vertical supporting bars. The frame member includes first and second surface portions and a connecting portion positioned between the first and second surface portions, with the first and second surface portions overlapping one another and the connecting portion being mounted on the horizontal supporting bar in a frictionally engaging manner allowing the frame member to be rotated relative to the horizontal supporting bar while also allowing the frame member to be fixed at a desired position by the frictional engagement between the connecting portion and the horizontal supporting bar. One of the first and second surface portions is provided with a cantilevered portion that permits adjustment of an amount of the frictional engagement between the connecting portion and the horizontal supporting bar.

According to a further aspect of the present invention, a headrest device includes a stay member and a frame member. The stay member has a pair of vertical supporting bars adapted to be supported on a seat back of a vehicle seat and a horizontal supporting bar connecting the pair of vertical supporting bars. The frame member has a connecting portion rotatably mounting the frame member on the horizontal supporting bar to produce a rotational friction force between the connecting portion and the horizontal supporting bar allowing the frame member to be fixed at a desired position relative to the stay member while also allowing the frame member to be rotated relative to the horizontal supporting bar upon application of a force. The frame member is provided with at least one projection in contacting engagement with the horizontal supporting bar along a longitudinal direction of the horizontal supporting bar.

In accordance with another aspect of the invention, a headrest device includes a stay member, a frame member and a pad mounted on the frame member. The stay member has a pair of vertical supporting bars adapted to be supported on a seat back of a vehicle seat and a horizontal supporting bar connecting the pair of vertical supporting bars. The frame member includes first and second surface portions and a connecting portion positioned between the first and second surface portions. The first and second surface portions overlap one another with the connecting portion being at least partially wrapped around the horizontal supporting bar in a frictionally engaging manner allowing the frame member to be rotated relative to the horizontal supporting bar while also allowing the frame member to be fixed at a desired position by the frictional engagement between the connecting portion and the horizontal supporting bar. One of the first and second surface portions is provided with an upstanding projection positioned adjacent the connecting portion to facilitate positioning of the connecting portion relative to the horizontal supporting bar.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
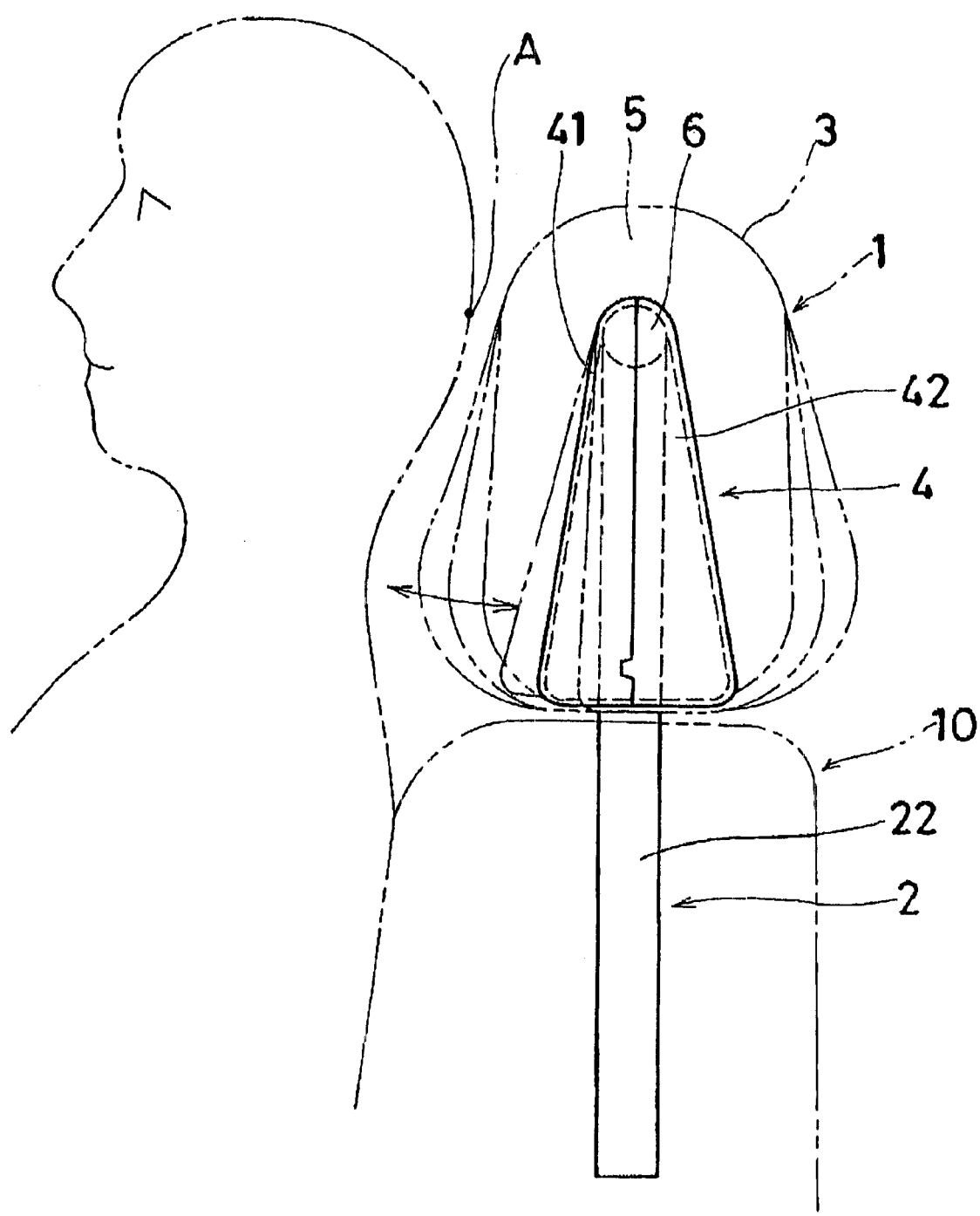
FIG. 1 is a side view of a headrest device according to the present invention.
Figure 2:
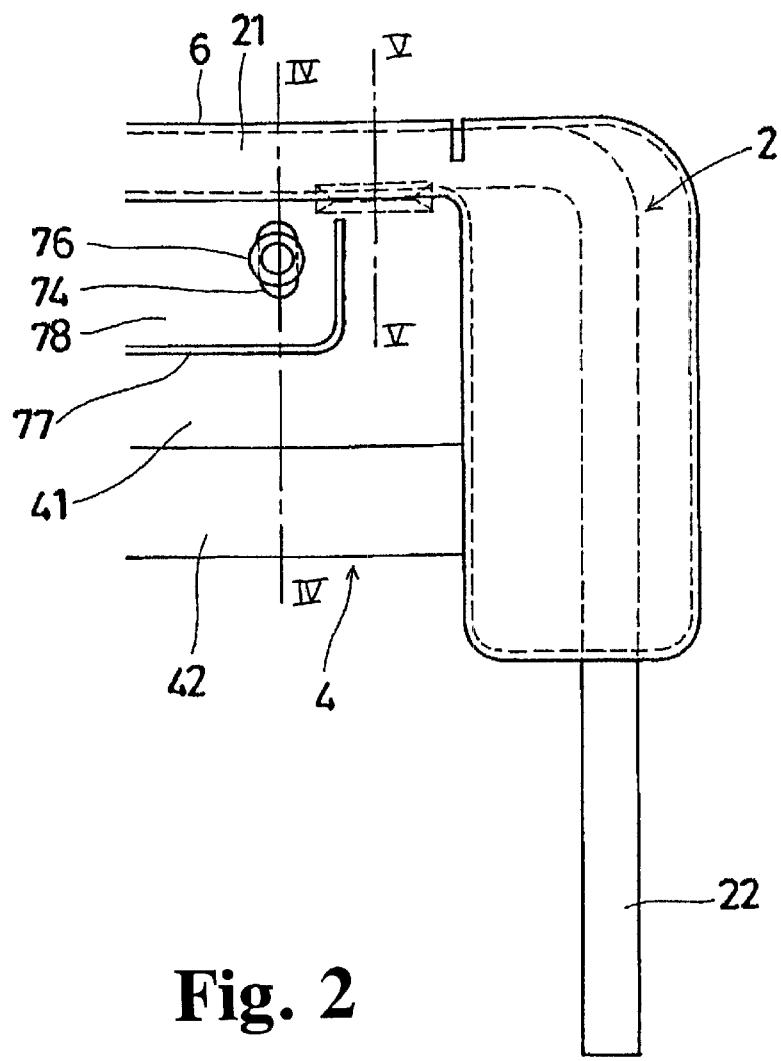
FIG. 2 is a rear view of a portion of the headrest device shown in FIG. 1.
Figure 3:
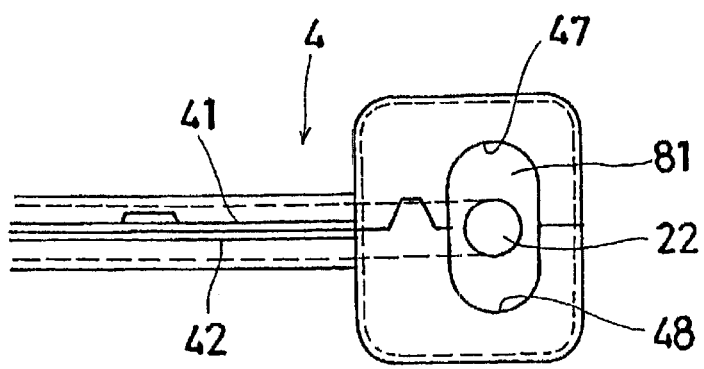
FIG. 3 is a bottom plan view of a portion of the headrest device shown in FIG. 2.
Figure 4:
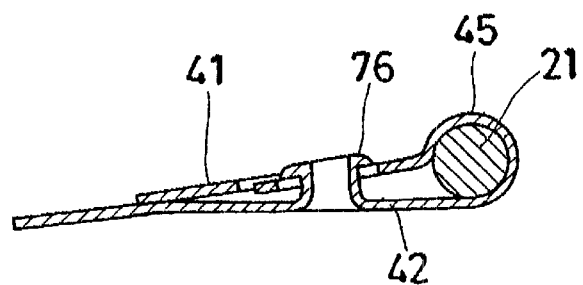
FIG. 4 is a cross-sectional view taken along the section line IV—IV in FIG. 2.
Figure 5:
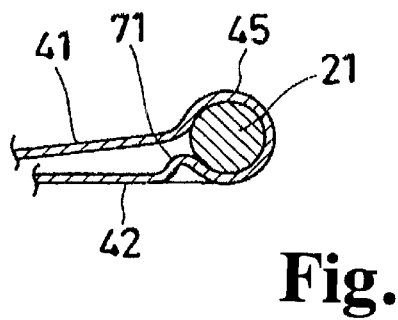
FIG. 5 is a cross-sectional view taken along the section line V—V in FIG. 2.

Referring initially to FIGS. 1–3, the headrest device 1 of the present invention is adapted to support the head of an occupant sitting on a vehicle seat. Generally speaking, the headrest device includes a stay member 2 and a main body 3. The stay member 2 is mounted in the upper portion of the vehicle seat as shown in FIG. 1 and supports the main body 3 so that the main body 2 is positioned above the upper portion of the seat back 10.

The stay member 2 includes a horizontal supporting bar portion 21 having a substantially round cross-section and a pair of vertical supporting bar portions 22 each connected to and extending downward from one of the ends (i.e., the right and left ends) of the horizontal supporting bar portion 21. In the drawing figures, only one of the vertical supporting bar portions 22 is illustrated, but it is to be understood that a similar vertical supporting bar portion 22 is provided at the opposite end of the horizontal supporting bar portion 21. The stay member 2 thus possesses a reverse or upside-down U-shaped configuration. The vertical supporting bar portions 22 are adapted to be engaged with the seat back 10 as shown in FIG. 1.

The main body 3 includes a pad 5 and a frame member 4 rotatably connected to or mounted on the horizontal supporting bar portion 21 of the stay member 2. The frame member 4 serves as a rigid portion of the headrest device 1 and is covered by the pad 5 which serves as a cushion.

The pad 5 is formed by a so-called injection molding method. To carry out the molding process, the stay member 2 and the frame member 4 are set in the molding dies for integral assembly with the pad 5.

Figure 6:
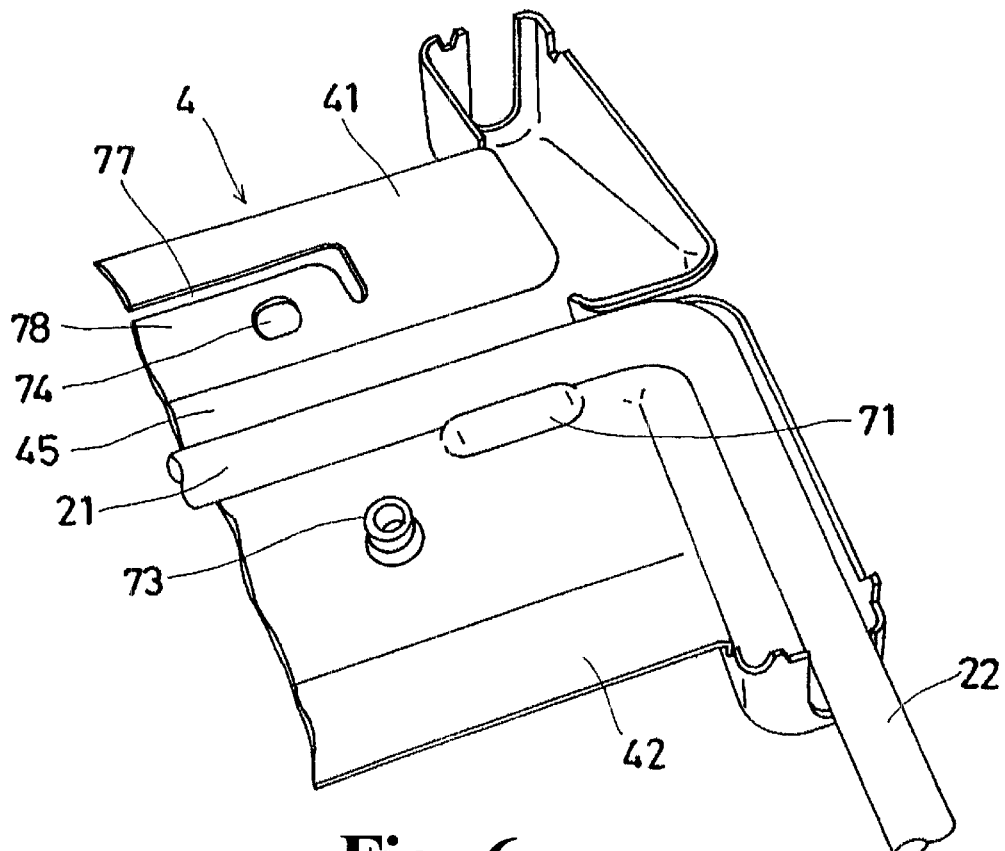
FIG. 6 is a perspective view of the headrest device before assembling the stay member and the frame member.
Figure 7:
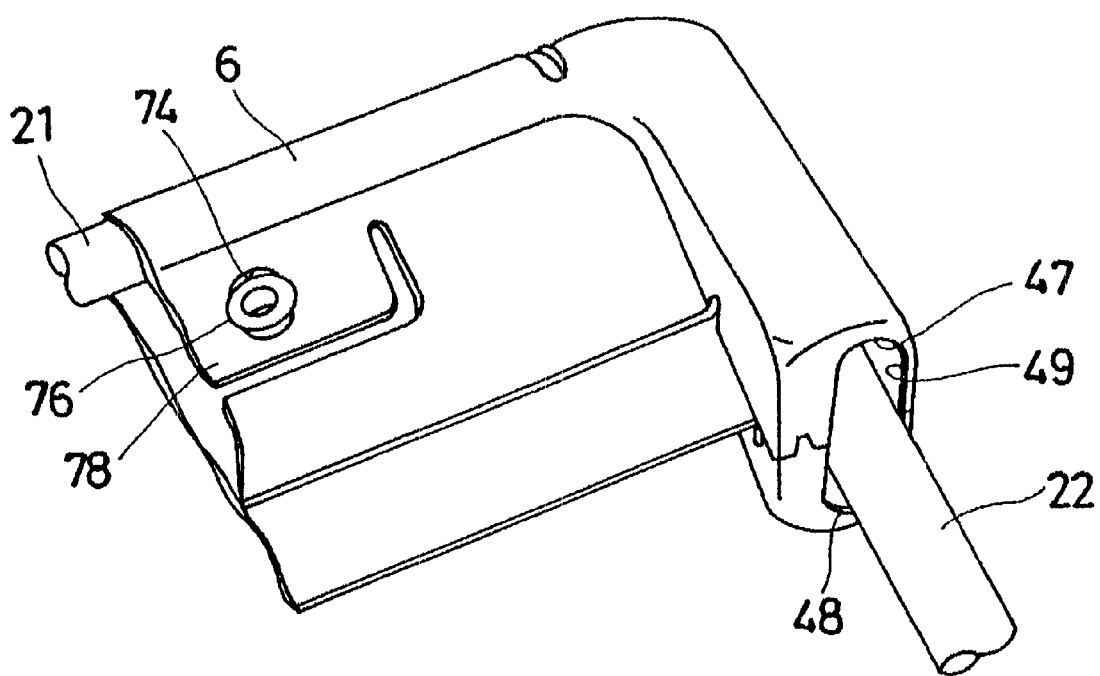
FIG. 7 is a perspective view of the headrest device after assembling the stay member and the frame member.

FIGS. 6 and 7 show the assembling process associated with the assembly of the frame member 4 and the stay member 2. It is to be understood that FIG. 6 illustrates approximately one-half of the frame member 4, with the other half of the frame member 4 being similarly configured. The frame member 4 is made from a single steel plate by press forming and includes a front surface portion 41, a rear surface portion 42 and a folding portion 45 located between and connecting the front surface portion 41 and the rear surface portion 42. The folding portion 45 thus forms a connecting portion 6 between the stay member 2 and the frame member 4. The assembly of the frame member 4 to the stay member 2 involves folding the front surface portion 41 over onto the rear surface portion 42 while also wrapping the folding portion on the horizontal supporting bar portion 21. After this folding, the front and rear surface portions 41, 42 are positioned in overlapping relationship to one another.

During the assembly process, a wrapping up force is applied on the surface of the folding portion 45 so that the folding portion 45 relatively tightly contacts the horizontal supporting bar portion 21 to ensure stable friction characteristics between the folding portion 45 and the horizontal supporting bar portion 21.

A pair of projections 71 is provided on the frame member 4 adjacent to the folding portion 45. While only the left side projection is shown in FIG. 6, it is to be understood that another projection is provided on the other side. The projections 71 extend along the axial direction of the horizontal supporting bar portion 21 to form a ridge that is raised relative to the surrounding portion of the frame member. The projections 71 advantageously assist in facilitating the positioning of the connecting portion 6 of the frame member 4 relative to the horizontal supporting bar portion 21 during the assembly process while also maintaining such relative positioning.

A slit 77 is provided on the front surface portion 41 of the frame member 4 at a location remote from or spaced from the connecting portion 6. The slit 77 is configured so that a central portion of the slit extends generally parallel with the horizontal supporting bar portion 21, while the end portions of the slit 77 extend towards the horizontal supporting bar portion 21 in a direction generally perpendicular to the central portion, thus forming an approximately U-shaped slit 77. It is to be understood once again that FIG. 6 only illustrates approximately one-half of the slit 77. The other portion of the slit 77 is configured in a manner similar to that shown in FIG. 6.

By virtue of the slit 77, a cantilever surface or cantilever portion 78 is formed on the front surface portion 41. This cantilever portion 78 is separated from the surrounding region of the front surface portion 41 and can thus be deformed about the connecting portion 6. As an alternative, it is to be appreciated that the slit 77 can be positioned on the rear surface portion 42.

The rear surface portion 42 of the frame is provided with burring portions or upstanding cylindrical elements 73, only one of which is shown in FIG. 6. Another burring portion or upstanding cylindrical element is similarly situated and provided on the other portion of the rear surface portion 42. In addition, the cantilever portion 78 is provided with holes 74, only one of which is shown in FIG. 6. Another hole is similarly situated and provided on the other portion of the front surface portion 42. During the assembly, as the front surface portion 41 is folded towards the rear surface portion 42, the burring portions or upstanding cylindrical elements 73 are inserted into the holes 74. The heads 76 of the burring portions or upstanding cylindrical elements 73 are then riveted or otherwise deformed so that the deformed heads engage the first surface portion 41 and help maintain the front surface portion 41 and rear surface portion 42 in the folded position. Thus, the folded portion 45 is maintained in a tightly contacting relationship with the horizontal supporting bar portion 21.

By the frictional force at the connecting portion 6, the headrest main body 3 possesses a sufficient holding force relative to the stay member 2. The frictional holding force can be adjusted by increasing or decreasing the riveting size of the head 76 (i.e., by deforming more or less the top portion of the upstanding cylindrical elements 73), thus adjusting the amount of deformation of the cantilever surface 78 about the connecting portion 6. The frictional holding force generated between the folding portion 45 and the horizontal supporting bar portion 21 at the connecting portion 6 can thus be set as desired for the headrest.

After assembling the headrest device in the manner noted above, the headrest position can be adjusted in the front or rear direction to accommodate the occupant's head and maintain the head at a position that is proper and comfortable by rotating the main body 3. This can be accomplished by applying a force to the main body 3 that is stronger than the frictional holding force.

As seen in FIG. 3, with the frame member assembled on the stay member 2, spaces 81 are formed on the left and right portions. These spaces 81 are formed between the front and rear surface portions 41, 42 and the spaces 81 surround or enclose the vertical supporting bar portions 22. That is, the spaces 81 exist between the outer surface of each of the vertical supporting bar portions 22 and the inner surface of the portions of the front and rear surface portions 41, 42 that surround the vertical supporting bar portions 22.

The frame members 4 can rotates on the stay member 2 within a range defined by the space 81. In other words, the position of the headrest of the main body 3 is adjustable in the front and rear direction within the range defined by the relative position of the vertical supporting bar portions 22 to the front end 47 or the rear end 48 (FIG. 3) of the lower end opening portion 49 of the space 81. The main body can thus be adjusted in the forward direction until the vertical supporting bar portions 22 contact the rear end 48 of the lower end opening portion 49 of the space 81 and can be adjusted in the rearward direction until the vertical supporting bar portions 22 contact the front end 47 of the lower end opening portion 49 of the space 81. The main body 3 can thus be adjusted in the manner shown in FIG. 1 so that the occupant's head is supported with a relatively minimal clearance or a desired clearance at point A while also providing the desired support below point A in a comfortable manner and in a manner well suited to facilitating safety such as during a collision.

After the frame member 4 and the stay member 2 are assembled, the assembled frame member 4 and stay member 2 are set in injection molding dies to integrally form the cushion 5. The frame member 4 substantially prevents the pad 5, or the material forming the pad during injection molding, from entering the space 81, thereby ensuring that the rotational space for the vertical supporting bar portions 22 of the stay member 2 are maintained.

According to the present invention, the headrest device 1 with the connecting portion 6 on the upper portion of the frame member 4 gives the occupant sitting on the vehicle seat a comfortable and fitting feeling.

In addition, the frictional holding force at the connecting portion 6 between the frame member 4 and the stay members 2 can be properly set at a desired level or strength, and can be maintained in a stable condition without any additional structure or parts. The present invention thus eliminates the need for special elements or parts similar to those associated with other known headrest devices as described above for generating the necessary frictional force.

Further, the headrest device of the present invention makes it possible to form the pad integrally as a unit with the frame member and the stay members by enclosing the vertical supporting bar portions 22 in the frame member 4, thus making the manufacturing process simple and reducing the cost.

The present invention is also advantageous from the standpoint that the frictional holding force at the connecting portion of the stay member and the frame member can be adjusted by changing or varying the engaging position of the cantilever surface 78 formed on the frame member 4 through appropriate adjustment of the riveting size of the burring portions or upstanding cylindrical elements 73.

Further, when the frame member 4 is assembled to the stay member by folding the two surface portions 41, 42 and wrapping the folding portion 45 about the horizontal supporting portion 21, the folding portion 45 and the horizontal supporting portion 21 can be caused to relatively tightly contact each other by providing the projections 71 on the frame member to define the position of the stay member 2 relative to the frame member 4. This arrangement advantageously enables the connecting portion of the frame member 2 generates a relatively stable friction holding force with the horizontal supporting portion 21 of the stay member 2.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A headrest device comprising:

a stay member having a pair of vertical supporting bars adapted to be supported on a seat back of a vehicle seat and a horizontal supporting bar connecting the pair of vertical supporting bars; and a frame member having a connecting portion rotatably mounting the frame member on the horizontal supporting bar to produce a rotational friction force between the connecting portion and the horizontal supporting bar allowing the frame member to be fixed at a desired position relative to the stay member while also allowing the frame member to be rotated relative to the horizontal supporting bar upon application of a force, the frame member including a slit having an intermediate portion and end portions, the end portions of the slit extending towards the connecting portion with the portion of the frame member bounded by the slit being resiliently deformed in a peripheral direction of the horizontal supporting bar to work as a fulcrum point for adjusting the rotational friction force between the connecting portion and the horizontal supporting bar.

2. The headrest device according to claim 1, wherein the frame member includes at least one projection contacting the horizontal supporting bar.

3. The headrest device according to claim 2, wherein the at least one projection is elongated and extends along a portion of the length of the horizontal supporting bar.

4. The headrest device according to claim 1, wherein the frame member includes a first surface portion and a second surface portion connected together by the connecting portion, the first and second surface portions being positioned in overlapping relation to one another.

5. The headrest device according to claim 4, wherein one of the first and second surface portions is provided with an upstanding element passing through a hole in the other of the first and second surface portions.

6. The headrest device according to claim 5, wherein the upstanding element includes a deformed upper portion that engages the other of the first and second surface portions to secure the first and second surface portions relative to one another.

7. A headrest device comprising:

a stay member having a pair of vertical supporting bars adapted to be supported on a seat back of a vehicle seat and horizontal supporting bar connecting the pair of vertical supporting bars;

a frame member that includes first and second surface portions and a connecting portion positioned between the first and second surface portions, the first and second surface portions overlapping one another with the connecting portion being mounted on the horizontal supporting bar in a frictionally engaging manner allowing the frame member to be rotated relative to the horizontal supporting bar while also allowing the frame member to be fixed at a desired position by the frictional engagement between the connecting portion and the horizontal supporting bar, the first and second surface portions forming spaces surrounding the pair of vertical supporting bars and allowing movement of the vertical supporting bars therein, one of the first and second surface portions being provided with a cantilevered portion that adjustment of an amount of the frictional engagement between the connecting portion and the horizontal supporting bar; and a pad positioned on the frame member.

8. The headrest device according to claim 7, wherein the second surface portion includes at least one projection contacting the horizontal supporting bar.

9. The headrest device according to claim 8, wherein the at least one projection is elongated and extends along a portion of the length of the horizontal supporting bar.

10. The headrest device according to claim 7, wherein one of the first and second surface portions is provided with an upstanding element passing through a hole in the other of the first and second surface portions.

11. The headrest device according to claim 10, wherein the upstanding element includes a deformed upper portion that engages the other of the first and second surface portions to secure the first and second surface portions relative to one another.

12. The headrest device according to claim 10, wherein the upstanding element or the hole is positioned in the cantilevered portion.

13. The headrest device according to claim 7, wherein the cantilevered portion is defined by a slit formed in the one of the first and second surface portions.

14. A headrest device comprising:

a stay member having a pair of vertical supporting bars adapted to be supported on a seat back of a vehicle seat and a horizontal supporting bar connecting the pair of vertical supporting bars; and a frame member having a connecting portion rotatably mounting the frame member on the horizontal supporting bar to produce a rotational friction force between the connecting portion and the horizontal supporting bar allowing the frame member to be fixed at a desired position relative to the stay member while also allowing the frame member to be rotated relative to the horizontal supporting bar upon application of a force, the frame member being provided with at least one projection in contacting engagement with the horizontal supporting bar along a longitudinal direction of the horizontal supporting bar, and forming splices surrounding the pair of vertical supporting bars and allowing movement of the frame member relative to the vertical supporting bars, the horizontal supporting bar of the stay member being positioned at an upper half of the frame member, with the frame member extending downwardly from the horizontal supporting bar.

15. The headrest device according to claim 14, wherein the frame member includes a first surface portion and a second surface portion connected together by the connecting portion, the first and second surface portions being positioned in overlapping relation to one another.

16. The headrest device according to claim 15, wherein the one of the first and second surface portions is provided with an upstanding element passing through a hole in the other of the first and second surface portions.

17. The headrest device according to claim 16, wherein the upstanding element includes a deformed upper portion that engages the other of the first and second surface portions to secure the first and second surface portions relative to one another.

18. The headrest device according to claim 14, wherein the frame member is provided with a cantilevered portion that is movable relative to portions of the frame member surrounding the cantilevered portion.

19. A headrest device comprising:

a stay member having a pair of vertical supporting bars adapted to be supported on a seat back of a vehicle seat and a horizontal supporting bar connecting the pair of vertical supporting bars;

a frame member that includes first and second surface portions and a connecting portion positioned between the first and second surface portions, the first and second surface portions overlapping one another with the connecting portion being at least partially wrapped around the horizontal supporting bar in a frictionally engaging manner allowing the frame member to be rotated relative to the horizontal supporting bar while also allowing the frame member to be fixed at a desired position by the frictional engagement between the connecting portion and the horizontal supporting bar, the first and second surface portions forming spaces surrounding the pair of vertical supporting bars and allowing movement of the frame member relative to the vertical supporting bars, one of the first and second surface portions being provided with an upstanding projection positioned adjacent the connecting portion to facilitate positioning of the connecting portion relative to the horizontal supporting bar;

the horizontal supporting bar of the stay member being positioned at an upper half of the frame member, with the first and second surface portions extending downwardly away from the connecting portion; and a pad positioned on the frame member.

20. The headrest device according to claim 19, wherein the second surface portion is provided with an upstanding element passing through a hole in the first surface portion, the upstanding element having a deformed upper portion that engages the first surface portion to secure the first and second surface portions relative to one another.

21. The headrest device according to claim 19, wherein the frame member is provided with a cantilevered portion that is movable relative to portions of the frame member surrounding the cantilevered portion.

22. The headrest device according to claim 19, wherein portions of the first and second surface portions surround portions of the vertical supporting bars with a space being provided between the first and second surface portions and the vertical supporting bars allowing the frame member to be rotated.

* * * * *